(12) United States Patent
Balasubramanian et al.

(10) Patent No.: US 9,197,576 B2
(45) Date of Patent: Nov. 24, 2015

(54) METHOD AND APPARATUS FOR ALLOCATING AND PRIORITIZING DATA TRANSMISSION

(75) Inventors: Sivaram Balasubramanian, Solon, OH (US); David A. Vasko, Solon, OH (US); Anatoly Moldovansky, Pepper Pike, OH (US); Kenwood H. Hall, Hudson, OH (US); Anthony G. Gibart, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 456 days.

(21) Appl. No.: 12/946,349

(22) Filed: Nov. 15, 2010

(65) Prior Publication Data

US 2012/0120966 A1   May 17, 2012

(51) Int. Cl.
*H04L 12/28* (2006.01)
*H04L 12/863* (2013.01)
*H04L 12/40* (2006.01)
*H04L 12/873* (2013.01)

(52) U.S. Cl.
CPC ........ *H04L 47/6215* (2013.01); *H04L 12/4015* (2013.01); *H04L 47/52* (2013.01)

(58) Field of Classification Search
None
See application file for complete search history.

(56) References Cited

U.S. PATENT DOCUMENTS

| | | | |
|---|---|---|---|
| 5,537,549 A | 7/1996 | Gee et al. | |
| 5,844,890 A | 12/1998 | Delp et al. | |
| 6,449,255 B1 * | 9/2002 | Waclawsky | 370/236 |
| 7,113,519 B2 * | 9/2006 | Hammel et al. | 370/458 |
| 7,274,691 B2 * | 9/2007 | Rogers | 370/389 |
| 7,324,510 B2 * | 1/2008 | Howe | 370/386 |
| 7,339,948 B2 | 3/2008 | Balasubramanian et al. | |
| 7,450,607 B2 | 11/2008 | Feld et al. | |
| 7,486,681 B2 | 2/2009 | Weber | |
| 7,656,865 B2 | 2/2010 | Brueckner et al. | |
| 2001/0043610 A1 * | 11/2001 | Nemirovsky et al. | 370/412 |
| 2002/0064157 A1 | 5/2002 | Krause | |
| 2003/0046414 A1 * | 3/2003 | Pettyjohn et al. | 709/230 |
| 2004/0059828 A1 * | 3/2004 | Hooper et al. | 709/238 |
| 2006/0056432 A1 * | 3/2006 | Azarov | 370/412 |

(Continued)

FOREIGN PATENT DOCUMENTS

| | | |
|---|---|---|
| EP | 1489877 A2 | 12/2004 |
| EP | 1748338 A1 | 1/2007 |
| EP | 1786149 A1 | 5/2007 |

(Continued)

OTHER PUBLICATIONS

Extended European Search Report dated Feb. 6, 2012, Application No. 11189174.3—(7) pages.

*Primary Examiner* — Nicholas Sloms
(74) *Attorney, Agent, or Firm* — Boyle Fredrickson, S.C.

(57) ABSTRACT

The subject matter disclosed herein describes a method to allocate and prioritize data communications on an industrial control network. A transmission schedule including multiple priority windows and multiple queues is established. Each queue is assigned to at least one priority window, and each priority window may have multiple queues assigned thereto. A control device communicating on the control network transmits data packets according to the transmission schedule. Within each priority window, data packets corresponding to one of the queues assigned to the priority window may be transmitted. The data packets may be transmitted at any point during the priority window, but will only be transmitted if no data packet from a higher queue is waiting to be transmitted.

23 Claims, 4 Drawing Sheets

(56) References Cited

U.S. PATENT DOCUMENTS

2006/0245454 A1* 11/2006 Balasubramanian et al. 370/509
2008/0181114 A1*  7/2008 Fourcand .................. 370/235
2009/0034524 A1   2/2009 Krause
2010/0232430 A1   9/2010 De

FOREIGN PATENT DOCUMENTS

WO  2007054387 A1  5/2007

* cited by examiner

METHOD AND APPARATUS FOR ALLOCATING AND PRIORITIZING DATA TRANSMISSION

BACKGROUND OF THE INVENTION

The subject matter disclosed herein relates generally to industrial control networks for controlling machines and industrial processes and, more specifically, to using time synchronization to allocate and prioritize data communications on the industrial control network for a distributed control system.

Industrial controllers are special purpose computers used for controlling factory automation and the like. Industrial controllers typically execute a control program highly customized to a particular control application. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and execute at well-defined time periods.

As industrial processes grow in complexity, an increasing number of devices are being connected to the industrial controller. The devices are often distributed about a machine or along a process line. An industrial network is typically used to connect the distributed devices and to allow data to be transmitted between the devices. In order to maintain reliability of the control program, communications between distributed devices must similarly be highly reliable and execute at well-defined time periods.

In response to the growing complexity of industrial networks, numerous industrial communication protocols have been developed to provide highly scheduled communications between distributed devices. These industrial protocols reserve time slots for individual devices to communicate on the network, ensuring that all critical communications can occur during a predefined time.

While these industrial communication protocols satisfy the structured demands of industrial communications, they are not without their drawbacks. Highly scheduled communications requirements restrict flexibility of industrial control systems. As the size and complexity of systems grow, an ever increasing number of communication and scheduling requirements, based on the interactions between devices, requires complex, recursive scheduling optimization routines. If future expansion of the system is desired, the entire schedule must be reconfigured to accommodate the new devices. Further, the expansion may have topology restrictions to ensure that the available bandwidth of the network meet performance requirements along each branch of the network. Thus, it is desirable to provide a system that satisfies the deterministic requirements of an industrial control system and retain flexibility for ease of setup and expansion.

BRIEF DESCRIPTION OF THE INVENTION

The subject matter disclosed herein describes a method to allocate and prioritize data communications on an industrial control network, including but not limited to an industrial Ethernet network utilizing the Institute for Electrical and Electronics Engineers (IEEE) 802.3 standard. A transmission schedule including multiple priority windows and multiple transmit priority queues is established. The transmission schedule defines a start time and duration for each priority window. Each priority window may have any number of priority queues assigned thereto and, optionally, may have no priority queues assigned thereto. Further, each priority queue may be assigned to one or more priority windows. A control device communicating on the control network transmits data packets according to the transmission schedule. Within each priority window, data packets corresponding to one of the priority queues assigned to the priority window may be transmitted. The data packets may be transmitted at any point during the priority window, but will only be transmitted if no data packet from a higher priority queue is waiting to be transmitted.

According to one embodiment of the invention, a network interface for an industrial control device configured to communicate on an industrial network includes a plurality of ports configured to connect to the industrial network. Each port has a transmit circuit and a receive circuit. The transmit circuit includes a plurality of queues. The network interface also includes a switch circuit. The switch circuit is in communication with each port and defines a plurality of priority windows. Each priority window has a duration and zero or more queues assigned to be transmitted within the priority window. During the duration of each priority window, the switch circuit is configured to initiate a transfer of a data packet present in the queues assigned to the priority window if no data packet from a higher priority queue assigned to the priority window is present. If no queue is assigned to a priority window, no new data packet transfer is initiated for the duration of that priority window.

Thus, it is a feature of the invention that data packets from a control device may be delivered deterministically, yet retain flexibility in the scheduled transmission. The number of priority windows and the queues assigned to each priority window are determined according to application requirements.

According to another embodiment of the invention, a method of transmitting data between multiple control devices on an industrial network defines a plurality of priority windows. Each priority window includes a start time and an end time. Multiple queues are also defined, and each queue is assigned to one or more priority windows. Data packets to be transmitted are assigned to one of the queues. During each priority window, each queue assigned to the priority window is monitored for data packets, and, if at least one queue is assigned to the priority window, transmitting data packets for each queue assigned to the priority window if no data packet from a higher queue assigned to the priority window is present and if no queue is assigned to the priority window, not transmitting any additional data packets.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
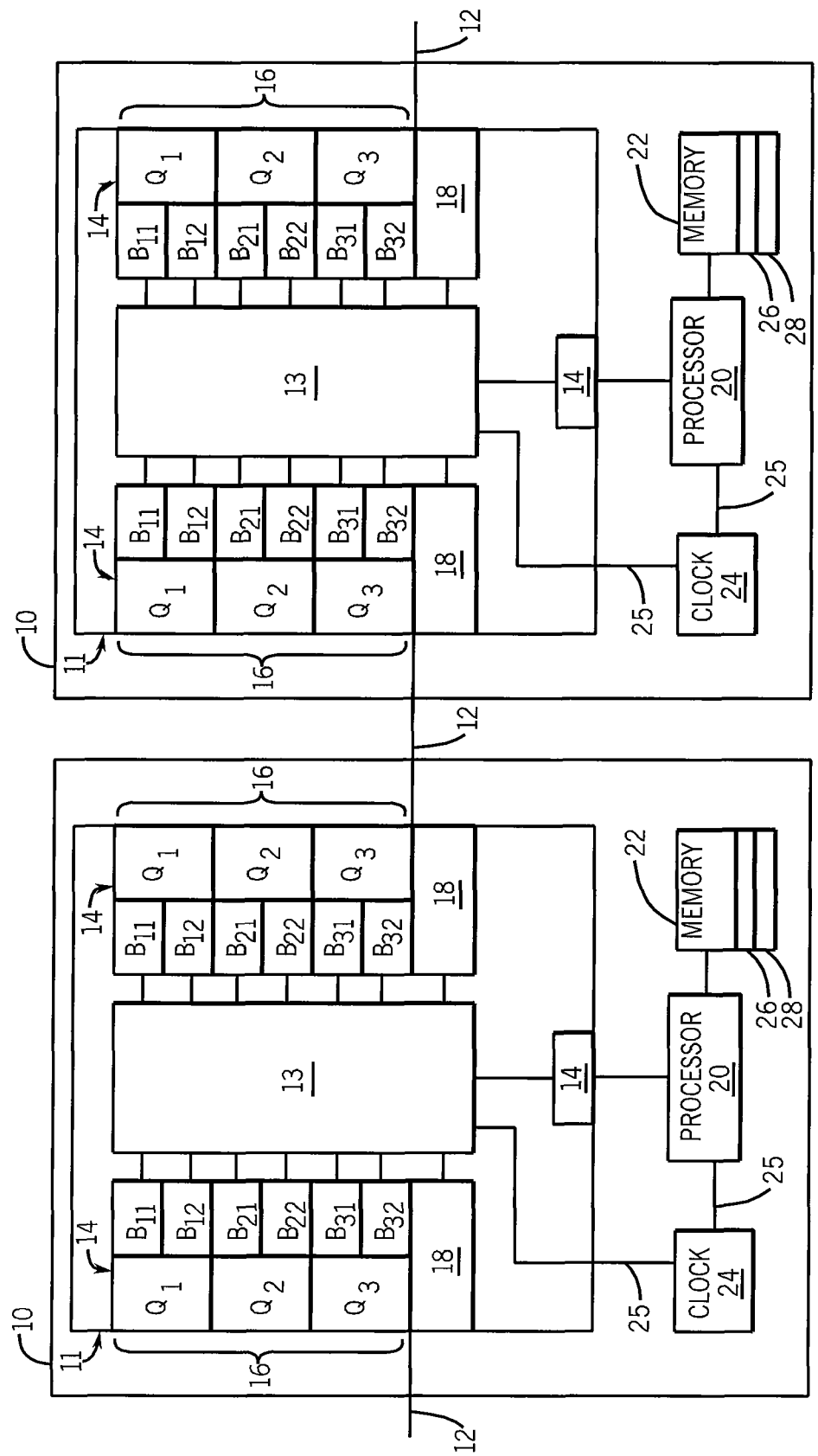
FIG. 1 is a block diagram representation of control devices communicating according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Referring initially to FIG. 1, a pair of industrial control devices 10 is illustrated communicating over a network 12. Each control device 10 includes a network interface 11 for connecting the device 10 to the network 12. Each network interface 11 includes at least one port 14 and, preferably, a pair of ports 14, each port 14 communicating to an adjacent device 10. Optionally, the network interface 11 may include additional ports 14 for communicating, for example, to a processor 20 or to additional devices 10. Communication on each port 14 is preferably full duplex, meaning frames may be transmitted and received at the same time, and at least one transmit circuit 16 and at least one receive circuit 18 are associated with each port 14.

The network interface 11 controls communications on each port 14. Each port 14 includes a transmit circuit 16 and a receive circuit 18. Each transmit circuit 16 includes multiple queues, Q1-Q3, and each queue, Q1-Q3, includes multiple buffers, Bxy, where "x" identifies the queue, Q, to which the buffer, B, belongs and "y" identifies the rank of the buffer, B, within each queue, Q. Although the exemplary embodiment illustrates three queues, Q, each having two buffers, B, it is contemplated that any number of queues, Q, and corresponding buffers, B, may be used without deviating from the scope of the invention. The network interface 11 is preferably implemented on an application specific integrated circuit (ASIC). Optionally, the network interface 11 may be implemented using any other suitable electronic device or a combination of electronic devices. The network interface 11 preferably communicates with the processor 20 via a third port 14 having transmit and receive circuits, 16 and 18. Optionally, the network interface 11 may be configured to communicate with the processor 20 over any suitable data bus. As yet another option, the processor 20 may be configured to directly interface with and manage the traffic on each port 14.

Each industrial control device 10 further includes at least one memory device 22. The memory device 22 is in communication with the processor 20 and optionally, is in communication with the network interface 11. The memory device 22 stores, among other data, processor executable instructions 26 and a transmission schedule 28 for the industrial control device 10. The memory device 22 may be implemented as either a single device or as multiple devices. Optionally, a portion of the ASIC on which the network interface 11 is implemented may be configured as memory and be directly accessible by other portions of the network interface 11.

Each industrial control device 10 further includes a real-time clock 24 providing a time signal 25 to the processor 20. The time signal 25 may be directly accessible to the network interface 11 or, optionally, accessible via the processor 20. The time signals 25 from each control device 10 are synchronized for uniform execution of the transmission schedule 28.

In order to coordinate execution of the transmission schedule 28 among each of the control devices 10, the time signal 25 from the real time clock 24 on each of the control devices 10 is synchronized to a master clock signal. Time synchronization may be performed according to any acceptable method, for example the IEEE 1588 standard for clock synchronization. Preferably, the real time clock 24 from one of the control devices 10 is selected to provide the master clock signal. Optionally, a separate real time clock may provide the master clock signal. The time signal 25 of each real time clock 24 is initially synchronized to the master clock signal and is preferably resynchronized on a periodic basis to ensure that the time signals 25 of each control device 10 remain synchronized.

Figure 2:
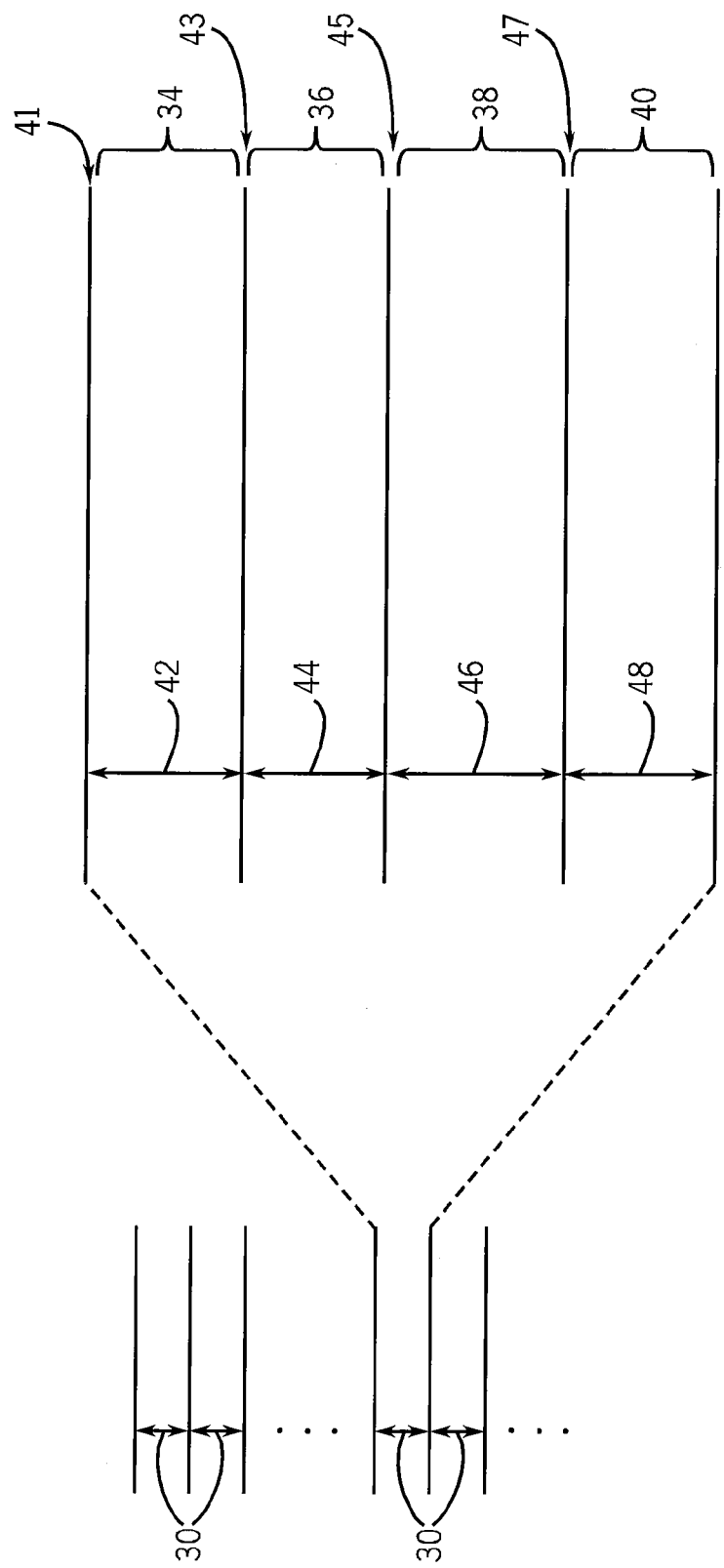
FIG. 2 is a block diagram representation of bandwidth allocation according to one embodiment of the present invention.

The switch circuit 13 includes data packet switching logic as well as logic defining priority windows for transmitting the data packets from each port 14 to the network 12. Referring also to FIG. 2, the illustrated embodiment includes a first, second, third, and fourth priority window, 34, 36, 38, and 40 respectively. Each priority window, 34, 36, 38, and 40, is further defined by a start time, 41, 43, 45, and 47, and duration, 42, 44, 46, and 48 respectively. The priority windows, 34, 36, 38, and 40, are executed within a periodic interval 30. Each of the start times, 41, 43, 45, and 47, and durations, 42, 44, 46, and 48, are configurable and initially loaded according to data stored in memory 22 in the transmission schedule 28.

The transmission schedule 28 allows flexibility in transmitting data packets within a priority window 34. For example, the number of priority windows and the queues, Q, assigned to each are configurable. Each queue, Q, may be assigned to one or more priority windows, and each priority window may have zero or more queues, Q, assigned thereto. In addition, the number of available priority windows is configurable by enabling or disabling execution of one or more priority windows. Further, the start time and duration of each priority window may be varied. Changes made to the transmission schedule 28 are both stored to memory 22 and transferred to the switch circuit 13. Initial configuration may be performed, for example, by an operator interface (not shown) connected to the control device 10 or by including preselected values in the processor executable instructions stored in memory 22. The processor 20 additionally monitors the performance of each priority window and may reconfigure the priority windows according to the monitored performance.

As illustrated in FIG. 2, an exemplary transmission schedule 28 may define four priority windows, 34, 36, 38, and 40. A first queue, Q1 may be used to transmit high priority data and be assigned to the first priority window 34. A second queue, Q2 may be used to transmit low priority data and be assigned to the second priority window 36. The third priority window 38 may be used as a time period for no data transmission and could, therefore, have no queues, Q, assigned. By assigning no queues, Q, to the third priority window 38, it may also serve as a time buffer, allowing a long, low priority message from the second priority window 36 to finish transmission. The fourth priority window 40 may be used for a combination of high and low priority data and have both the first queue, Q1, and the second queue, Q2, assigned thereto.

Similarly, additional queues, Q, may be assigned to transmit high priority, low priority, or any one of an intermediate priority data packet, and each queue, Q, may be assigned to one or more priority windows according to the system requirements.

Within a priority window, the transmission of data packets is flexible and preferably executes on a first-in, first-out (FIFO) basis from the buffers, B, of each queue, Q, according to the priority level of each queue, Q, assigned to the priority window. For example, a first queue, Q1, and a second queue, Q2, may be assigned to transmit during the second priority window 36, where the first queue, Q1 has higher priority than the second queue, Q2. Any data packets present in a buffer, B, of the first queue, Q1, at the start of the duration 44 of the priority window 36 will begin transmitting and continue transmitting up to the duration 44 of the priority window 36 on a FIFO basis. However, a data packet from the second queue, Q2, may also begin transmitting at the start of the priority window 36 if no data packet is present in the first queue, Q1. Further, the second queue, Q2, will continue to transmit all of the data packets stored in the second queue, Q2, as long as no data packet arrives for the first queue, Q1. If a data packet assigned to the first queue, Q1, arrives while data packets from the second queue, Q2, are transmitting, the new data packet in the first queue, Q1, will be transmitted following the data packet from the second queue, Q2, currently being transmitted. Any remaining data packets in the second queue, Q2, will resume transmission following transmission of the data packet from the first queue, Q1. If the duration 44 of the second priority window 36 ends before all data packets are transmitted, the remaining data packets will stay in the buffers, B, of their respective queue, Q, for transmission during the next priority window to which that queue, Q, has been assigned. If a priority window has no queues, Q, assigned to it, no additional data packet transmissions will be initiated during that priority window. However, if there was an ongoing transmission from the previous priority window, the data packet being transmitted will be allowed to complete transmission during the priority window with no queue, Q, assigned.

In operation, the switch circuit 13 manages communications between the control device 10 and the network 12. Each external receive circuit 18 receives data packets from the network 12, and the internal receive circuit 18 receives data packets from the processor 20. The switch circuit 13 monitors the receive circuit 18 of each port 14 and transfers the incoming data packets to the appropriate queue, Q, of each transmit circuit 16 according to data contained within the data packet. Each data packet typically includes an address identifying the proper destination for the data packet. The network interface 11 transfers data packets intended for that control device 10 to the port 14 connected to the processor 20 and transfers data packets intended for another control device to the appropriate queue, Q, of each transmit circuit 16 of the other port 14 for subsequent transmission to the next adjacent control device 10. Each data packet preferably includes a field identifying a priority level for that data packet, utilizing either a custom or a standard marking scheme, for example IEEE 802.3 priority tags or Internet Protocol Differentiated Services Code Point (IP DSCP) priority levels. The priority level of the data packet identifies to which queue, Q, it will be assigned. In addition, multiple priority levels may be assigned to one queue, Q. The switch circuit 13 periodically executes the transmission schedule 28 at a predefined interval 30, and each transmit circuit 16 is coordinated to execute the transmission schedule 28 at substantially the same time.

Figure 3:
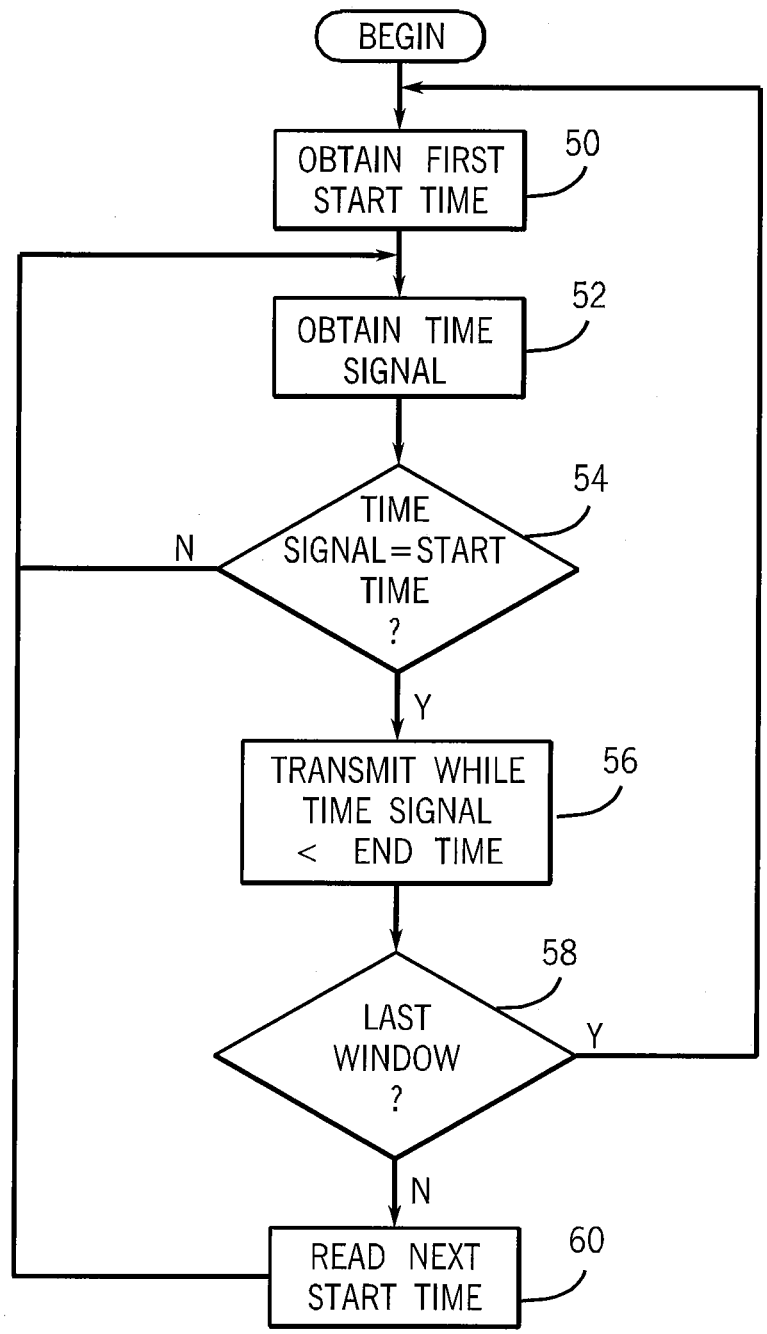
FIG. 3 is a flowchart illustrating coordinating the priority windows of FIG. 2 with the real time clock signal.

The switch circuit 13 is configured to control transfer of data packets from the transmit circuit 14 to the network 12 according to the configuration of the priority windows. Referring to FIG. 3, the start time of the first priority window 34 is obtained at step 50. The current value of the time signal 25 from the real time clock 24 is obtained at step 52. At step 54, the switch circuit 13 compares the time signal 25 to the start time of the priority window 34. If the time signal 25 does not equal the start time, the switch circuit 13 continues to monitor the time signal 25 until it is equal to the start time. When the time signal 25 is equal to the start time for the first priority window 34, transmission of the data packets in the queues assigned to the first priority window 34 begins and will continue for the duration 42 of the priority window 34, as shown in step 56. At step 58, the routine determines whether another priority window is active. If so, the switch circuit 13 obtains the start time of the next priority window at step 60 and again monitors the time signal 25 until it is equal to the start time of the next priority window according to steps 52 and 54. The process repeats until each of the active priority windows has had an opportunity to transmit. Once the last active priority window has executed, the switch circuit 13 loops back to step 50 and repeats the routine.

Figure 4:
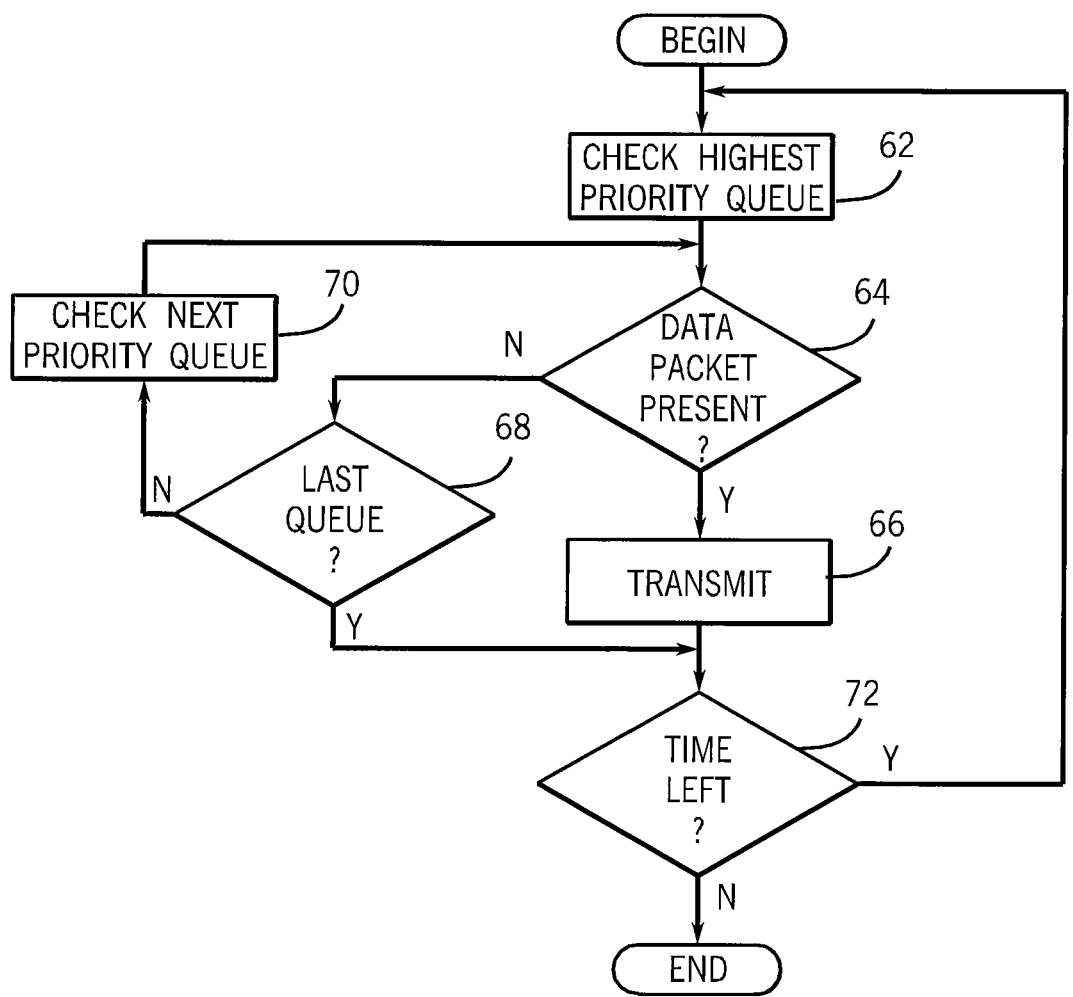
FIG. 4 is a flowchart illustrating transmitting data packets for one of the priority windows of FIG. 2.

The switch circuit 13 is further configured to manage transmission of the data packets from each of the queues, Q, assigned to one the priority windows. Referring to FIG. 4, the routine identifies the highest priority queue, Q, assigned to the priority window at step 62. At step 64, the routine determines whether any data packets are present in the buffers, B, of the highest level queue, Q, associated with the priority window. If so, the data packets from the highest level queue, Q, begin to transmit at step 66, preferably on a FIFO basis. If, at step 64, no data packets for the highest queue, Q, are present, the routine determines, at step 68, whether any queues, Q, at a lower level are also assigned to the priority window. If, at step 68, the routine was monitoring the lowest level queue, Q, in the priority window and no data packets exist in the transmit circuit 16, the routine checks the time remaining for transmission of that priority window at step 72. If, at step 68, there is another queue, Q, having a lower priority than the last queue, Q, being monitored, the routine identifies the next lower queue, Q, as shown in step 70, and returns to step 64. At step 64, if there are data packets present for the new queue, Q, being monitored, the routine begins transmitting these data packets, again on a first in first out (FIFO) basis. After each data packet is transmitted, at step 72 the routine checks whether there is any remaining time for the priority window. If time remains, the routine loops back to continue monitoring the transmit circuit 16 for data packets in any of the queues, Q, belonging to the priority window.

The processor 20 may monitor performance of the transmission schedule 28 and the corresponding network transmissions according to certain metrics and modify the transmission schedule 28 as desired. Metrics used to evaluate performance of the transmission schedule may include, but are not limited to: jitter, the repeatability of transmitting a data packet at a desired time within the transmission schedule 28; latency, the delay between requesting a data packet be transmitted and when it is transmitted; and available bandwidth, the amount of time at a given interval not being utilized. For example, if data packets in a particular queue, Q, are taking too long to transmit, the processor 20 may modify the transmission schedule 28 accordingly. For example, the transmission schedule may be modified by assigning a queue, Q, to an additional priority window or by extending the duration of a priority window. Modifications to the transmission schedule 28 are transmitted to each device 10 in the system such that all devices 10 retain the same schedule 28.

According to one embodiment of the present invention, the control devices 10 may be arranged in a daisy-chain configuration, meaning the network 12 connects each control device 10 in series with either one or two other control devices 10. The network 12 is connected to each control device 10 at a port 14 having transmit and receive circuits, 16 and 18. If the control device 10 generates a data packet to be transmitted on the network 12, the data packet is assigned a priority level and placed in a buffer, B, of the respective queue, Q. The data packets are then transmitted on the network 12 to the next link in the chain, according to the transmission schedule 28 as previously described. Incoming data packets to a port 14 on the control device 10 enter the receive circuit 18. An address in the data packet may be used to determine whether that control device 10 is the intended recipient of the data packet. If so, the data packet may be transferred to the processor 20 of the control device 10. If not, the data packet may be transferred to the transmit circuit 16 of the other port 14 and passed on to the next control device 10 in the chain, according to the transmission schedule 28.

According to another embodiment of the present invention, the control devices 10 may be arranged in a tree, star, or any combination of daisy-chain, tree, and star topologies. Control devices 10 in a star or tree topology will have more than two external ports 14.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A network interface for an industrial control device configured to communicate with a plurality of other industrial control devices on an industrial network, comprising:
   a plurality of ports, each port having a transmit circuit and a receive circuit, wherein:
   the receive circuit is configured to receive a plurality of incoming data packets from each of the other industrial control devices,
   at least one of the ports is configured to be connected to the industrial network,
   the transmit circuit includes a plurality of queues, and
   each queue has an execution priority with respect to the other queues; and
   a switch circuit configured to read an identifier from each incoming data packet and transfer each incoming data packet to one of the queues as a function of the identifier wherein:
   data packets from multiple other industrial control devices are assigned to each of the plurality of queues as each data packet is received,
   the switch circuit is further configured to execute a transmission schedule at a periodic interval,
   the transmission schedule defines at least a first and a second priority window within the periodic interval,
   the first priority window has a first predefined duration and has a plurality of queues assigned to be transmitted within the first predefined duration,
   the second priority window has a second predefined duration and zero or more queues assigned to be transmitted within the second predefined duration, wherein the second predefined duration is different from the first predefined duration, and
   the switch circuit synchronously executes the transmission schedule on each of the ports to transmit the data packets from each of the queues according to the execution priority of each queue assigned to each priority window.

2. The network interface of claim 1 wherein the switch circuit is configured not to initiate the transfer of a data packet for the duration of one of the priority windows if no queue is assigned to the second priority window.

3. The network interface of claim 1 wherein at least one of the first and the second priority window has more than one queue assigned.

4. The network interface of claim 1 wherein a data packet corresponding to any one of the queues assigned to one of the first and the second priority window may be transmitted at any time during the corresponding predefined duration for the priority window.

5. The network interface of claim 1 further comprising a real-time clock configured to provide a time signal to the switch circuit, wherein the time signal is synchronized to a master clock signal on the industrial network and each of the first and the second priority window has a start time corresponding to the time signal.

6. The network interface of claim 1 further comprising a processor configured to operate the industrial control device wherein one of the ports is configured to be connected between the switch circuit and the processor.

7. An industrial control device configured to communicate with a plurality of other industrial control devices on an industrial network, comprising:
   a processor;
   a memory device in communication with the processor storing a transmission schedule and a plurality of processor executable instructions; and
   a network interface in communication with the processor, the network interface further comprising:
   a plurality of ports, each port having a transmit circuit and a receive circuit, wherein:
   the receive circuit is configured to receive a plurality of incoming data packets from each of the other industrial control devices,
   at least one of the ports is configured to be connected to the industrial network,
   the transmit circuit includes a plurality of queues, and
   each queue has an execution priority with respect to the other queues; and
   a switch circuit configured to read an identifier from each incoming data packet and transfer each incoming data packet to one of the queues as a function of the identifier wherein:
   data packets from multiple other industrial control devices are assigned to each of the plurality of queues as each data packet is received,
   the switch circuit is further configured to execute a transmission schedule at a periodic interval,
   the transmission schedule defines at least a first and a second priority window within the periodic interval,
   the first priority window has a first predefined duration and has a plurality of queues assigned to be transmitted within the first predefined duration, the second priority window has a second predefined duration and zero or more queues assigned to be transmitted within the second predefined duration, wherein the second predefined duration is different from the first predefined duration, and the switch circuit synchronously executes the transmission schedule on each of the ports to transmit the data packets from each of the queues according to the execution priority of each queue assigned to each priority window.

8. The industrial control device of claim 7 wherein the switch circuit is configured not to initiate the transfer for the duration of one of the priority windows if no queue is assigned to the second priority window.

9. The industrial control device of claim 7 wherein the transmission schedule defines a start time and the duration of each of the first and the second priority window and wherein the instructions are executable on the processor to transfer the start time and duration of each of the first and the second priority window to the switch circuit.

10. The industrial control device of claim 9 wherein the instructions are further executable on the processor to monitor the data packets transferred by the network.

11. The industrial control device of claim 10 wherein the transmission schedule is adjustable responsive to at least one predetermined communication metric and wherein the instructions are further executable to transfer the adjusted transmission schedule to the switch circuit.

12. The industrial control device of claim 11 wherein the instructions are further executable on the processor to reassign queues to the first and the second priority windows responsive to at least one predetermined communication metric.

13. The industrial control device of claim 9 further comprising a real-time clock configured to provide a time signal to the switch circuit, wherein the time signal is synchronized to a master clock signal on the industrial network and each start time and duration correspond to the time signal.

14. The industrial control device of claim 13 wherein the time signal of each device is periodically resynchronized to the master clock.

15. The industrial control device of claim 14 wherein the transmission schedule is a universal schedule used by each device connected to the industrial network.

16. The industrial control device of claim 7 wherein one of the ports is configured to be connected between the switch circuit and the processor.

17. A method of transmitting data between a plurality of control devices on an industrial network, comprising the steps of:
defining a transmission schedule configured to execute at a periodic interval;
defining a plurality of priority windows within the transmission schedule, each priority window having a start time and an end time;
defining a plurality of queues, each queue assigned to one or more priority windows and assigned an execution priority with respect to the other queues;
defining at least one buffer assigned to each queue, wherein the at least one buffer stores data packets prior to transmission;
receiving with a receive circuit on one of the plurality of control devices a plurality of incoming data packets from each of the other control devices;
assigning each of the plurality of incoming data packets to one of the buffers assigned to each queue as each data packet is received, wherein data packets from multiple other control devices are assigned to one of the queues; and
executing the transmission schedule on each port of each of the plurality of control devices to transmit the data packets according to the following steps;
sequentially executing of the priority windows in the order defined by the transmission schedule;
transmitting data packets present in each buffer assigned to the queue with the highest execution priority assigned in each priority window prior to transmitting the data packets in each buffer assigned to any queue with a lower execution priority assigned to the same priority window, and
transmitting data packets present in each buffer assigned to a queue within the predefined duration of the priority window to which the queue is assigned.

18. The method of claim 17 further comprising the initial step of synchronizing a real-time clock on each of the control devices to a master clock.

19. The method of claim 18 wherein the real-time clock on one of the control devices is the master clock.

20. The method of claim 18 wherein the start time and the end time of each priority window correspond to a time signal generated by the real-time clock.

21. The method of claim 17 further comprising the initial step of reading an initial value for each of the start time and the end time from the predefined transmission schedule.

22. The method of claim 21 further comprising the steps of
monitoring the transmission of data packets from each queue; and
redefining at least one of the start time of one of the priority windows, the end time of one of the priority windows, or the queues assigned to each priority window responsive to the transmission of data packets.

23. A network interface for an industrial control device configured to communicate with a plurality of other industrial control devices on an industrial network, comprising:
a plurality of ports, each port having a transmit circuit and a receive circuit, wherein:
the receive circuit is configured to receive a plurality of incoming data packets from each of the other industrial control devices,
at least one of the ports is configured to be connected to the industrial network,
the transmit circuit includes a plurality of queues,
each queue has at least one buffer assigned to the queue, and
each queue has an execution priority with respect to the other queues; and
a switch circuit configured to read an identifier from each incoming data packet and transfer each incoming data packet to a buffer selected from the at least one buffer assigned to each queue, wherein the identifier defines to which queue the data packet is assigned and wherein:
data packets from multiple other industrial control devices are assigned to one of the buffers assigned to each of the plurality of queues,
the switch circuit is further configured to execute a transmission schedule at a periodic interval,
the transmission schedule defines: a plurality of priority windows, a predefined duration for each of the priority windows, and which of the plurality of queues are assigned to be processed during each of the priority windows; and the switch circuit synchronously executes the transmission schedule on each of the ports to transmit the data packets from each of the queues such that:

each of the plurality of priority windows is sequentially executed in the order defined by the transmission schedule, within each of the plurality of priority windows, the data packets present in each buffer assigned to the queue with the highest execution priority assigned to that priority window are transmitted prior to transmitting the data packets present in each buffer assigned to any queue with a lower execution priority assigned to the same priority window, and transmission of data packets present in each buffer assigned to a queue within the predefined duration of the priority window to which the queue is assigned.

\* \* \* \* \*